Oct. 31, 1933.          C. H. KAIN          1,933,376
REMOTE CONTROL APPARATUS
Filed April 9, 1931     8 Sheets-Sheet 1
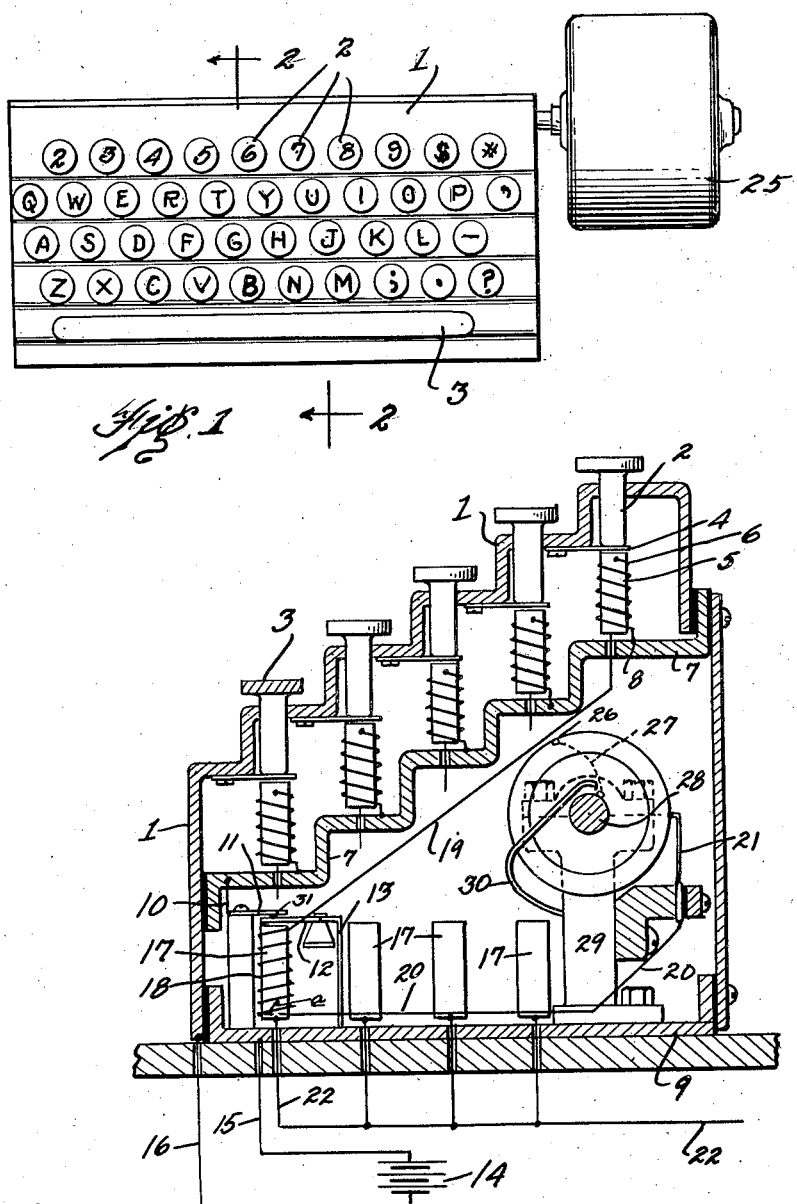
INVENTOR.
CLIFFORD H. KAIN
BY
ATTORNEY.

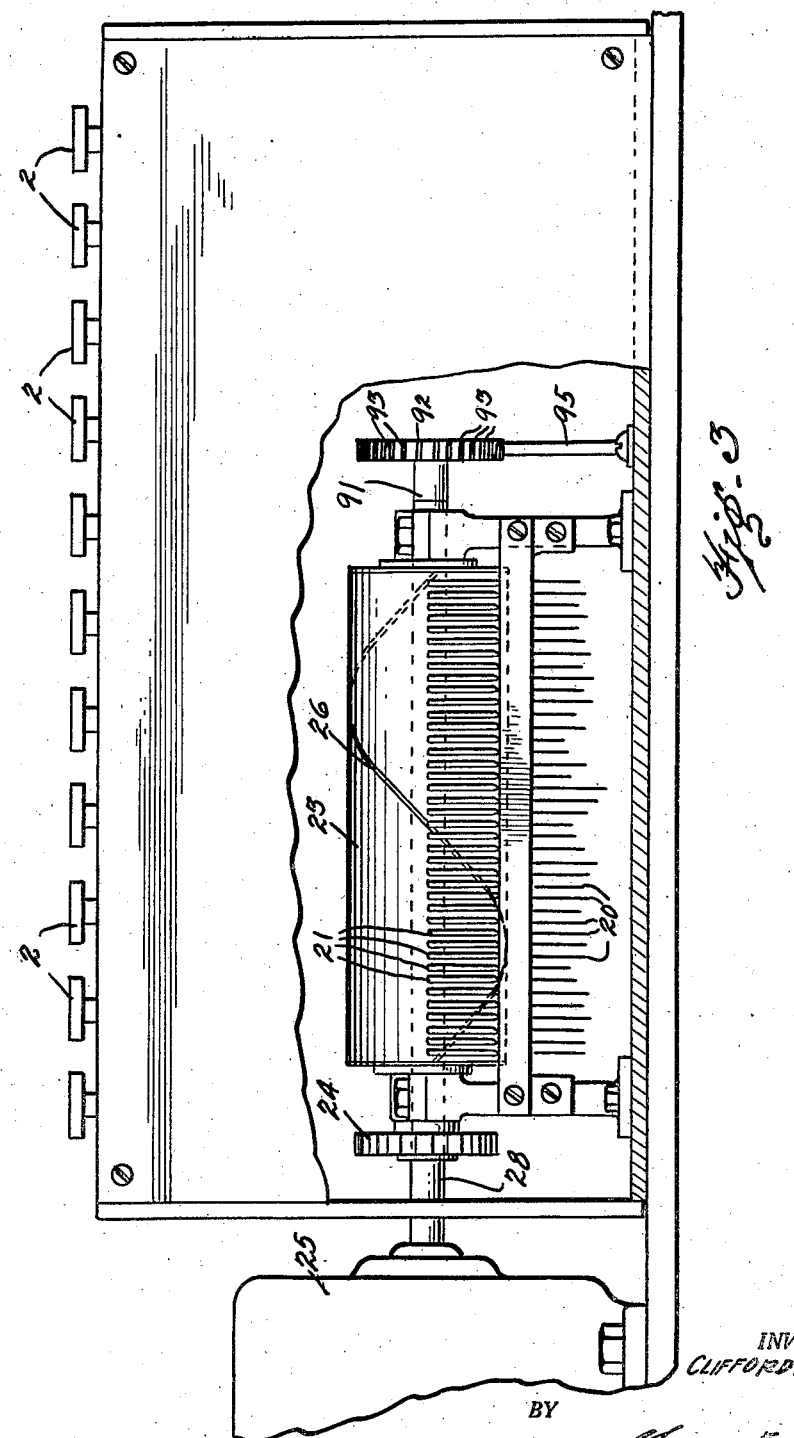

Oct. 31, 1933.  C. H. KAIN  1,933,376
REMOTE CONTROL APPARATUS
Filed April 9, 1931  8 Sheets-Sheet 3
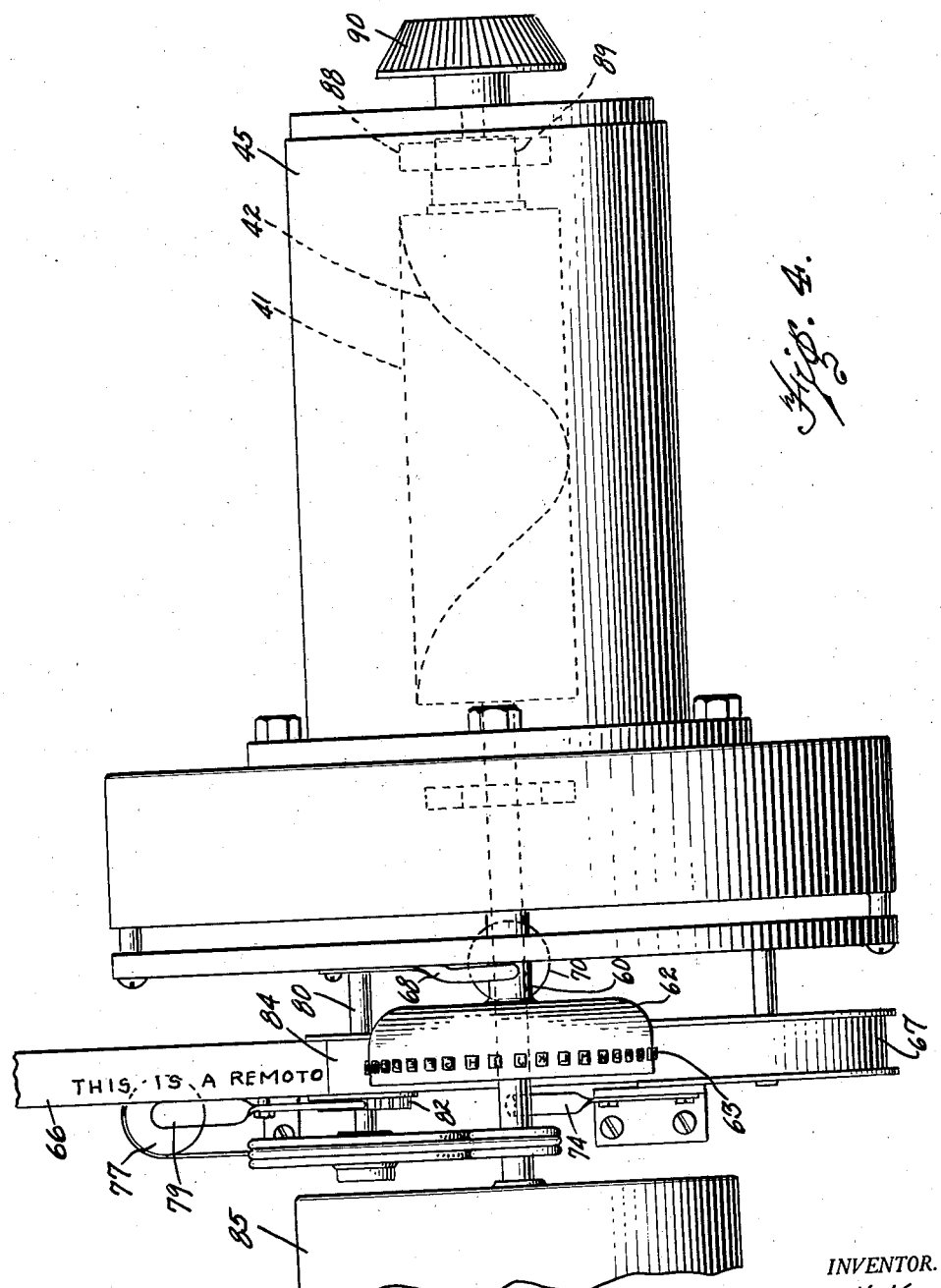
INVENTOR.
CLIFFORD H. KAIN
BY
ATTORNEY.

Oct. 31, 1933.                    C. H. KAIN                    1,933,376
                         REMOTE CONTROL APPARATUS
                         Filed April 9, 1931            8 Sheets-Sheet 4
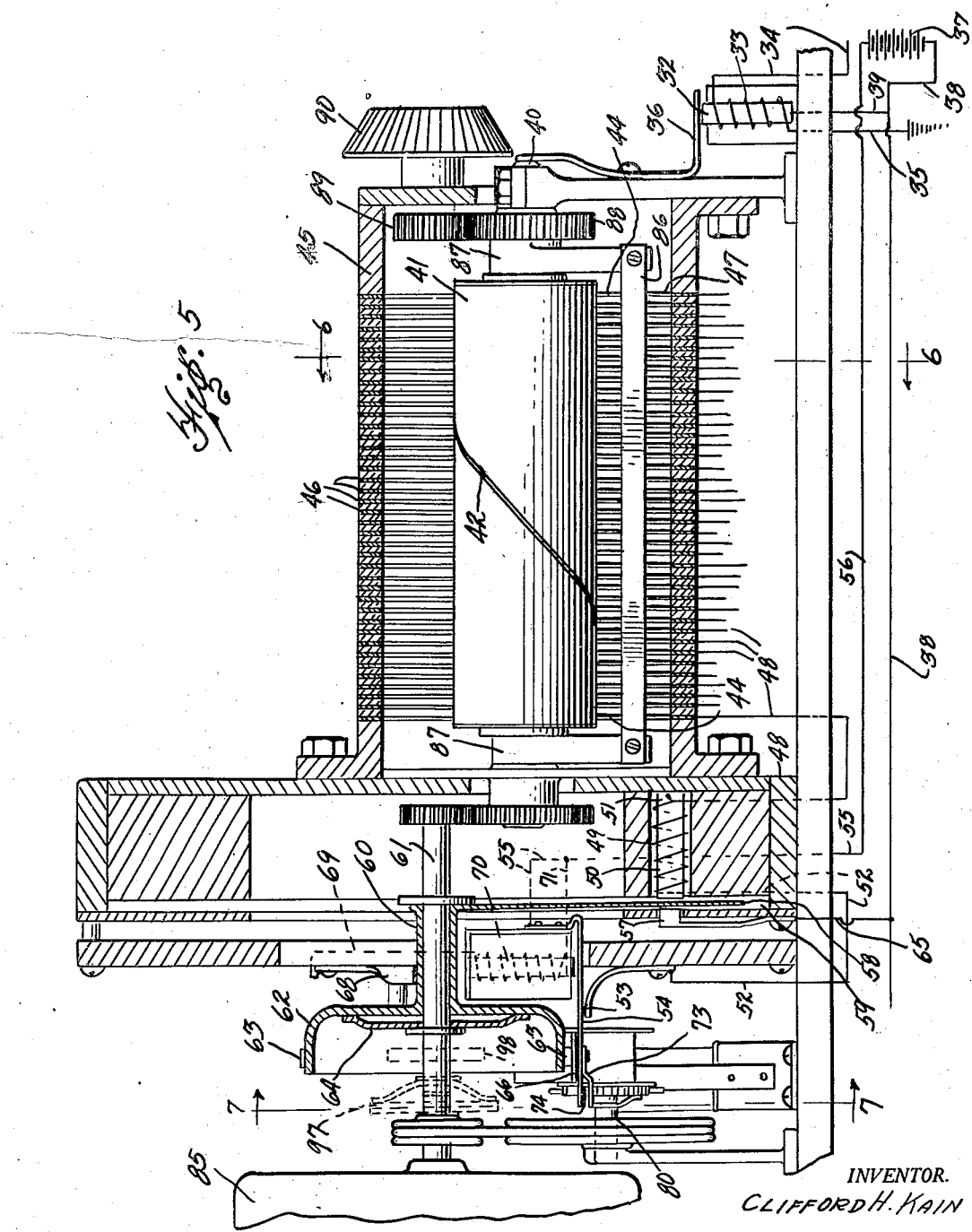
INVENTOR.
CLIFFORD H. KAIN
BY
ATTORNEY.

Oct. 31, 1933.   C. H. KAIN   1,933,376
REMOTE CONTROL APPARATUS
Filed April 9, 1931   8 Sheets-Sheet 5

INVENTOR.
CLIFFORD H. KAIN
BY
ATTORNEY.

INVENTOR.
CLIFFORD H. KAIN
BY
ATTORNEY.

Oct. 31, 1933.   C. H. KAIN   1,933,376
REMOTE CONTROL APPARATUS
Filed April 9, 1931   8 Sheets-Sheet 7
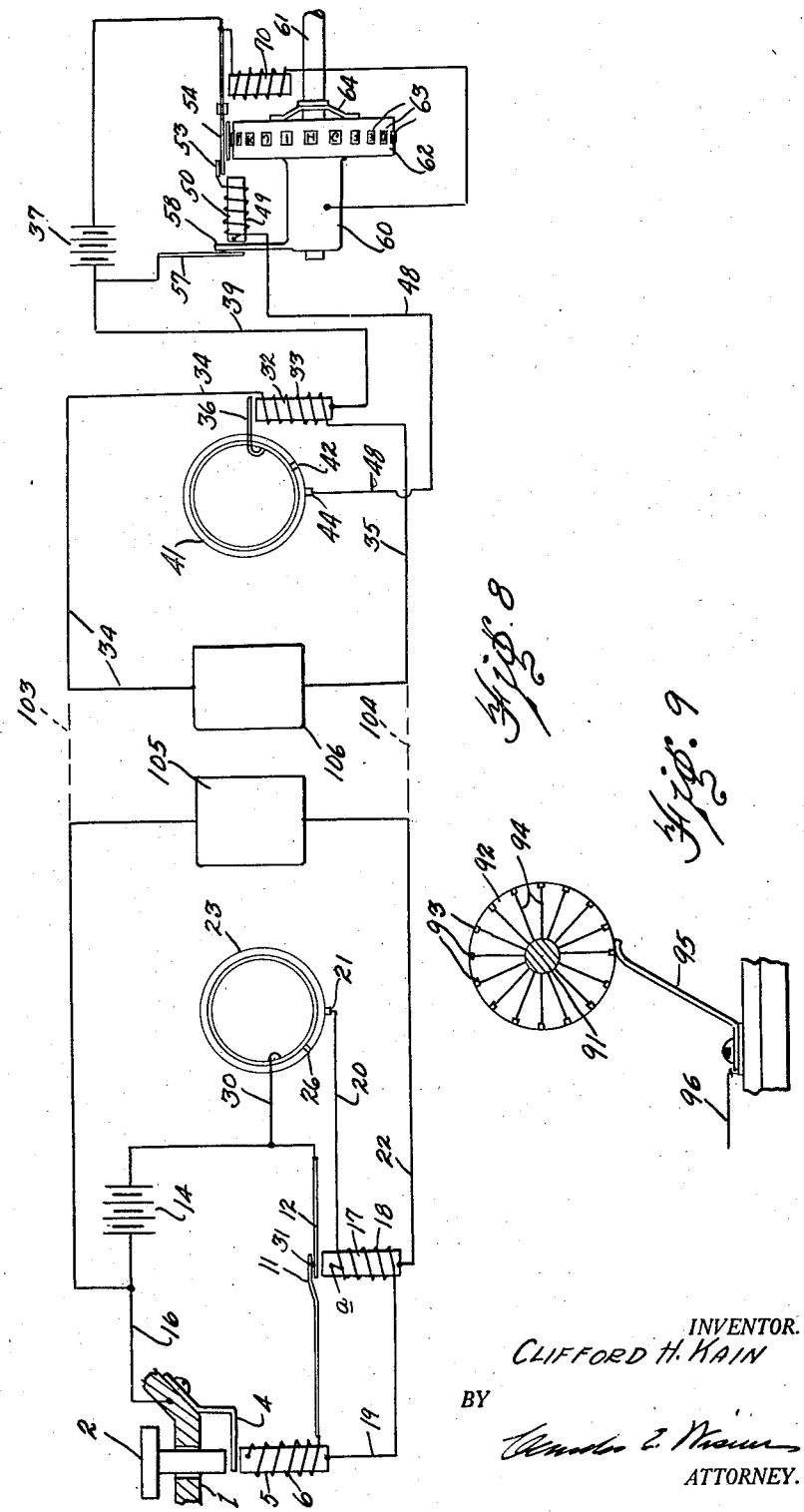
INVENTOR.
CLIFFORD H. KAIN
BY
ATTORNEY.

Oct. 31, 1933.   C. H. KAIN   1,933,376
REMOTE CONTROL APPARATUS
Filed April 9, 1931   8 Sheets-Sheet 8
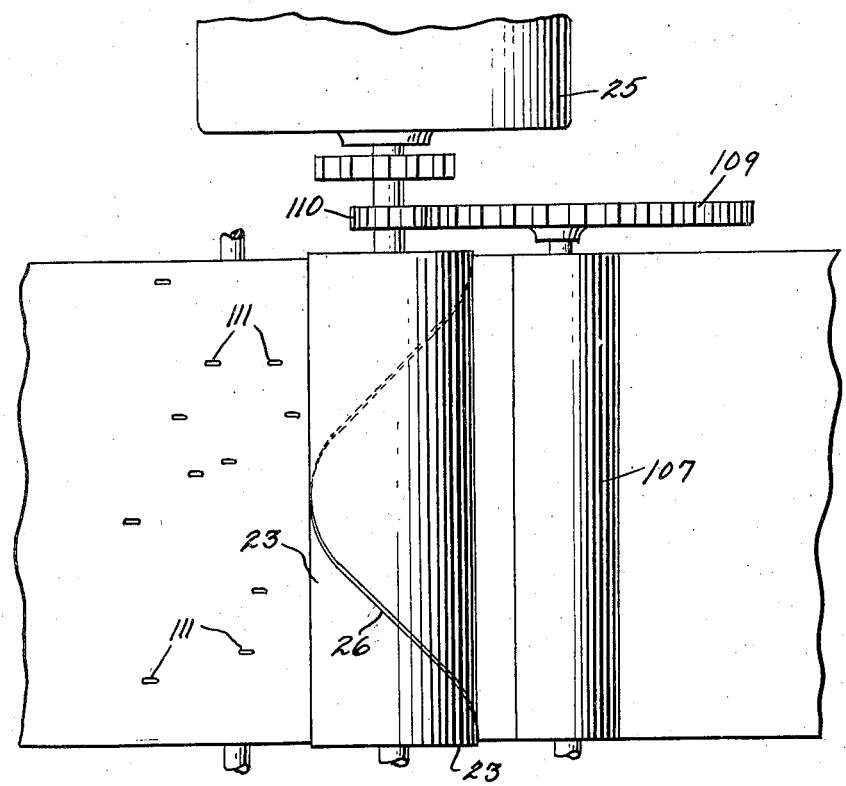
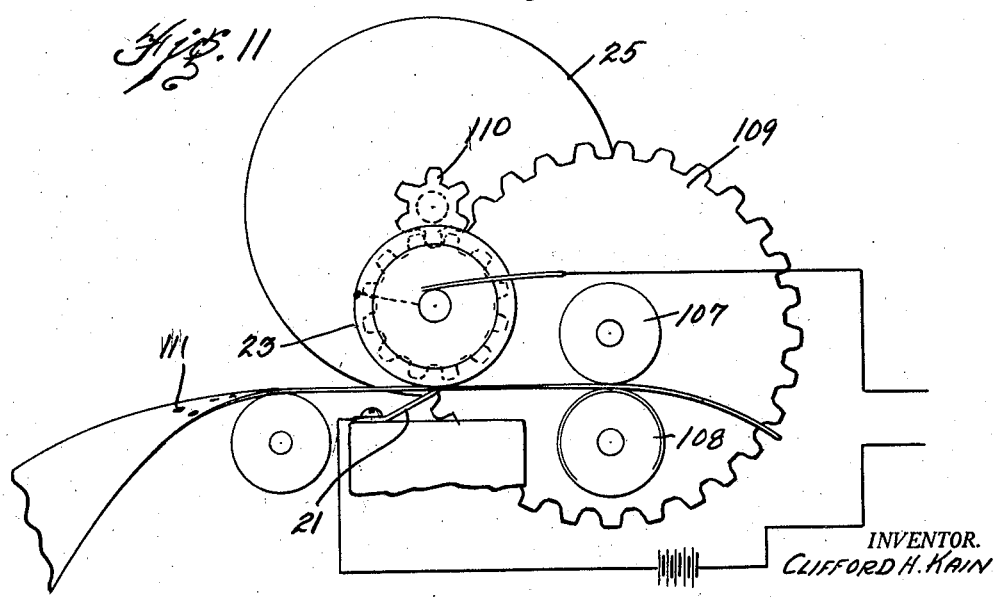
INVENTOR.
CLIFFORD H. KAIN
BY
ATTORNEY.

Patented Oct. 31, 1933

1,933,376

UNITED STATES PATENT OFFICE 1,933,376

REMOTE CONTROL APPARATUS

Clifford H. Kain, San Carlos, Calif., assignor of one-third to Otis K. Richard and one-third to Clement C. Richard, both of Detroit, Mich.

Application April 9, 1931. Serial No. 528,871

23 Claims. (Cl. 178—4)

This invention relates to means for remote communication and the object of the invention is to provide a sending and receiving instrument adapted for transmitting and printing typed messages.

The invention in its broader sense may be utilized in controlling airplanes, submarines, torpedoes and the like by remote control or may be utilized for playing a remote piano but the embodiment of the invention here shown and described, is utilized particularly for transmitting and receiving typed messages.

One of the particular objects of the invention is to provide a compact and simple arrangement of parts whereby the sending or receiving of messages may be accomplished with less equipment and in a simpler manner than heretofore utilized so as to make it possible to broaden the field of typed messages now more or less confined to the telegraph.

Another object of the invention is to provide a transmitter and a receiver in which the theory of operation is based upon providing synchronously rotating drums or discs in the transmitting and sending machines arranged so that an electric impulse originating on the rotating drum of the transmitting machine is received on the receiving drum in a corresponding postion, the said electric impulse acting through electrical and mechanical connections to print a letter according to the contact made by the transmitter.

Another object of the invention is to provide a manually operated arrangement for synchronizing the rotation of the receiving drum with the rotation of the transmitting drum.

These objects and the several novel features of the invention are hereinafter more fully described and claimed and the preferred form of construction by which these objects are attained is shown in the accompanying drawings in which—

Fig. 1 is a plan view of a transmitting machine embodying my invention.

Fig. 2 is an enlarged section taken on line 2—2 of Fig. 1.

Fig. 3 is a side elevation of the transmitting machine broken away to show the rotating drum.

Fig. 4 is a plan view of the receiving machine.

Fig. 5 is a longitudinal section therethrough.

Fig. 8 is a diagrammatic view of the sending and receiving circuits.

Fig. 9 is a diagrammatic view showing the synchronizing contact wheel.

Fig. 11 is a plan view of an alternative form of the device.

Fig. 12 is an end view thereof.

Figure 6:
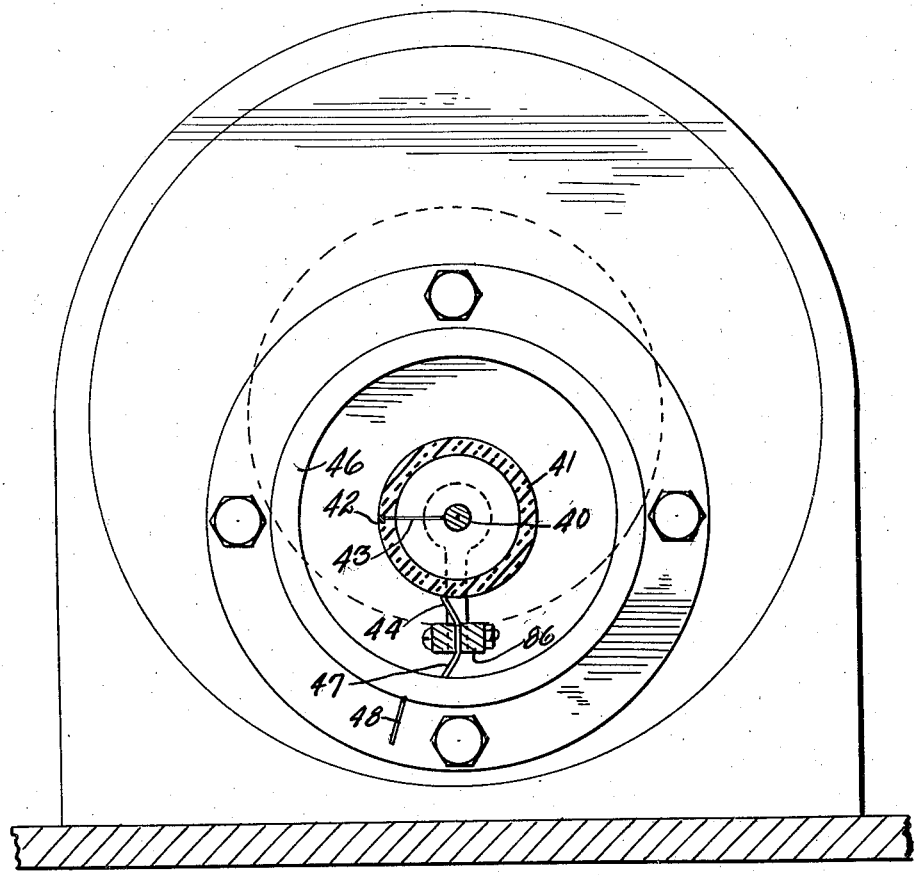
Fig. 6 is a section taken on line 6—6 of Fig. 5.

The transmitting machine, as shown in Fig. 1, comprises a casing having a top plate 1 in which the keys 2 are mounted, the keys being arranged similar to the standard typewriter keyboard and the machine being provided with a spacer bar 3 at the lower edge. These keys 2 are each supported on a spring metal armature 4 of an electro-magnet having a core 5 and a coil 6. The coil 6 is connected at one end to the core 5 and at the opposite end is connected to a plate 7 at the point 8 shown in Fig. 2. This plate 7 is insulated from the plate 1 as shown and is also insulated from the remainder of the casing. A bottom plate 9 is also provided and is also insulated from the remainder of the casing as shown. A wire 10 is connected to the plate 7 at one end and to an arm 11 at the opposite end which is provided with a contact point contacting the armature 12 which is connected by the wire 13 to the plate 9. The armature 12 extends over an electro-magnet core 17 having a coil 18 wound thereabout and this coil 18 at one end is connected by the wire 19 to the electro-magnet core 5 and the opposite end of the coil 18 is connected by a wire 20 to the spring contact brush 21.

The electro-magnet core 17 is connected to a wire 22 which leads to a radio transmitter or direct by wire to a receiving station. When the key 2 at the top of Fig. 2 is depressed, the current flows from the battery 14 through the wire 16, plate 1, armature 4, coil 6, plate 7, wire 10, arm 11, armature 12, wire 13, plate 9 and wire 15 to the opposite pole of the battery or other source of electric power. When this circuit is completed by the contact of the armature 4 with the magnet core 5, the armature 4 will remain held in contact with the magnet until by some other means the circuit is broken.

As shown in Fig. 3 the drum 23 may be rotated direct or through gears 24 by means of an electric motor 25 and this drum is formed from insulating material and is provided with a spiral contact strip 26. The spiral contact 26, as shown in Fig. 2, is in constant contact with one pole of the battery 14 by means of the wire 27 leading to the shaft 28 which is connected to the base 29 by means of a brush and wire 30. As the member 29 is in electrical contact with the plate 9 the current flows through the plate 9 and wire 15 to the battery 14. The other side of the circuit is represented by the brushes 21 and as many magnets 17 as there are keys to be operated, as will be understood from Figs. 2 and 3.

As the drum 23 is rotated the contact spiral 26 makes sequential contacts with the brushes 21 so that when the magnet 5 is energized by contact with the armature 4, the circuit is completed through the wire 20, coil 18, wire 19, core 5, armature 4 and through the casing and wire 16 back to the other pole of the battery 14. When this circuit is complete the magnet 17 is energized and attracts the armature 12 and breaks the first circuit at the contact point 31 which de-energizes the magnet 5 and releases the armature 4 thus leaving both circuits open as they were at the begininng. At the time the magnet 17 is energized and draws the armature 12 into contact with its core, another circuit is completed from the battery through the wire 15, plate 9, wire 13, armature 12, through the core 17 of the electro-magnet and through the wire 22 direct to the receiving station or to a radio transmitter. The impulse carried by this last named circuit is the operating impulse which causes the action required at the receiving end such as the printing of a letter.

In order to prevent the repetition of an impulse due to the fact that the key 2 might be depressed for an instant beyond the time that the impulse is created by the contact of the brush 21 with the contact strip 26, I show at "a" in Figs. 2 and 8 the wire of the coil 18 connected to the pole piece 17 so that only one impulse is sent out when the transmitting key 2 is depressed regardless of how long it is held down.

This is explained as follows: The primary object is made as previously described and the connection at the point 31 is broken at the time the impulse is made, by the energization of the electro-magnet 17 which brings the armature 12 into contact with the core 17 of this electro-magnet completing the circuit from the battery or power source 14 through the wire 16, casing 1, armature 4, core 5, wire 19, coil 18, core 17 and through the armature 12 which is in contact with this core 17 and wire 13 through the plate 9 and wire 15 back to the power source 14 thus keeping the magnet 17 energized and holding the armature 12 in contact with the core 17 until the circuit is broken by the release of the armature 4 from the core 5. By this arrangement, duplication of an impulse and consequent repetition of a printed letter is prevented as one impulse is created regardless of the time the transmitting key is held down.

At the lower right hand end of Fig. 5 is an electric-relay magnet 32 having a coil 33 wound thereabout to which the wire 34 is connected which may be a continuation of the wire 22 from the transmitter or may be connected to a radio receiving set depending upon whether wire or wireless communication is utilized. The opposite end of this coil is connected to ground by the wire 35.

The impulse from the transmitting machine passing through the coil 33 energizes this magnet and attracts the armature 36. As soon as the armature 36 contacts the core 32, the current flows from the battery 37 through the wires 38 and 39 through the core 32 and armature 36 and through the armature into the shaft 40 of the insulated receiving drum 41. The machine may be provided with an insulated base or the shaft 40 may be insulated from its bearing and the drum 41 is identical with the drum 23 of the transmitter and is provided with a spiral contact strip 42. As shown in Fig. 6, a contact wire 43 is connected to the shaft 40 and to the spiral contact strip 42 so that the current may pass from the shaft 40 to the contact strip and thence to the different brushes 44 which ride in contact with the surface of the drum 41 as will be understood from Fig. 6. An outer tubular member 45 is provided having a series of contact rings 46 therein and each brush 44 is provided with a contact end 47 riding in contact with the respective ring 46. These contact rings are each connected by means of a wire 48, shown in Fig. 5, to the coil 49 of an electro-magnet 50. Each wire 48, as will be understood from Fig. 5, is connected to the coil 49 and also to the core 50 at the point 51. By this arrangement the current impulse passes from the contact strip 42 through the respective brush 44 and through the respective ring 46 to the wire 48 from which the current passes through the coil 49 and wire 52 to the contact point 53 and thence through the armature 54 and through the wires 55 and 56 back to the battery 37.

The flow of current through the coil 49 energizes the electro-magnet and draws the armature 57 down against the core 50 of the electro-magnet. At this time the end of the armature 57 is in the path of travel of the pointer 58 so that the pointer in revolving through the space 59 strikes the armature 57. This pointer 58 is secured to or may be part of a bushing 60 which is rotatably mounted on the shaft 61 and the bushing 60 at the end is formed to provide a type drum 62 having faces 63 provided with the same characters as the keys of the transmitting machine shown in Fig. 1. Secured to the shaft 61 is a friction clutch 64 which normally carries the type drum with the shaft but when the pointer 58 is stopped, the friction clutch allows the type drum and pointer to remain stationary. As the armature 57 contacts the core 50, the current flows from the wires 38 and 65 through the armature 57, core 50 and through the connection 51, thence through coil 49, wire 52, contact 53 and armature 54 through the wires 55 and 56 back to the battery or power source 37 thereby energizing the magnet 50 and holding the armature 57 in contact therewith until the circuit is otherwise broken. As the pointer strikes the armature 57 the type drum is stopped with the type character selected immediately above the armature 54 and a paper strip 66 extends between the armature 54 and the face of the type, the paper strip being carried from a paper roll 67 shown in Fig. 7.

At this time a circuit is completed through the pointer 58 from the wires 38 and 65 and through the armature 57 and current passes through the pointer 58 which is in contact with the armature 57 at this time and through the brush 68 riding in contact with the bushing 60 and through the wire 69 to the electro-magnet 70, the circuit being completed through the wire 71 and wires 55 and 56 to battery. This energizes the electro-magnet 70 thus drawing the printing armature 54 upwardly and pressing the paper strip against the type character 63 which is inked from the inking roll 72, shown in Fig. 7, and thus the character is printed on the paper strip.

It is evident that the forward movement of the paper strip or tape 66 should be accomplished only after the actual printing of the letter, therefore I have devised a means by which the paper is moved forward the proper space by return movement of the printing armature 54. As will be noted from Fig. 5, the printing armature 54 is provided with a bracket 73 of insulating material secured thereto and providing a bifurcated end on the printing armature. As will be noted from Fig. 7, a contact strip 74 is provided and extends within the bifurcated end of the printing armature. As hereinbefore described, the printing armature 54 is in constant connection with one pole of the battery 37 by the wires 55 and 56 so that when the printing armature moves up in the act of striking the letter, the insulating member 73 picks up the end of the contact strip 74 until the opposite end thereof engages the contact 75, shown in Fig. 7.

Figure 7:
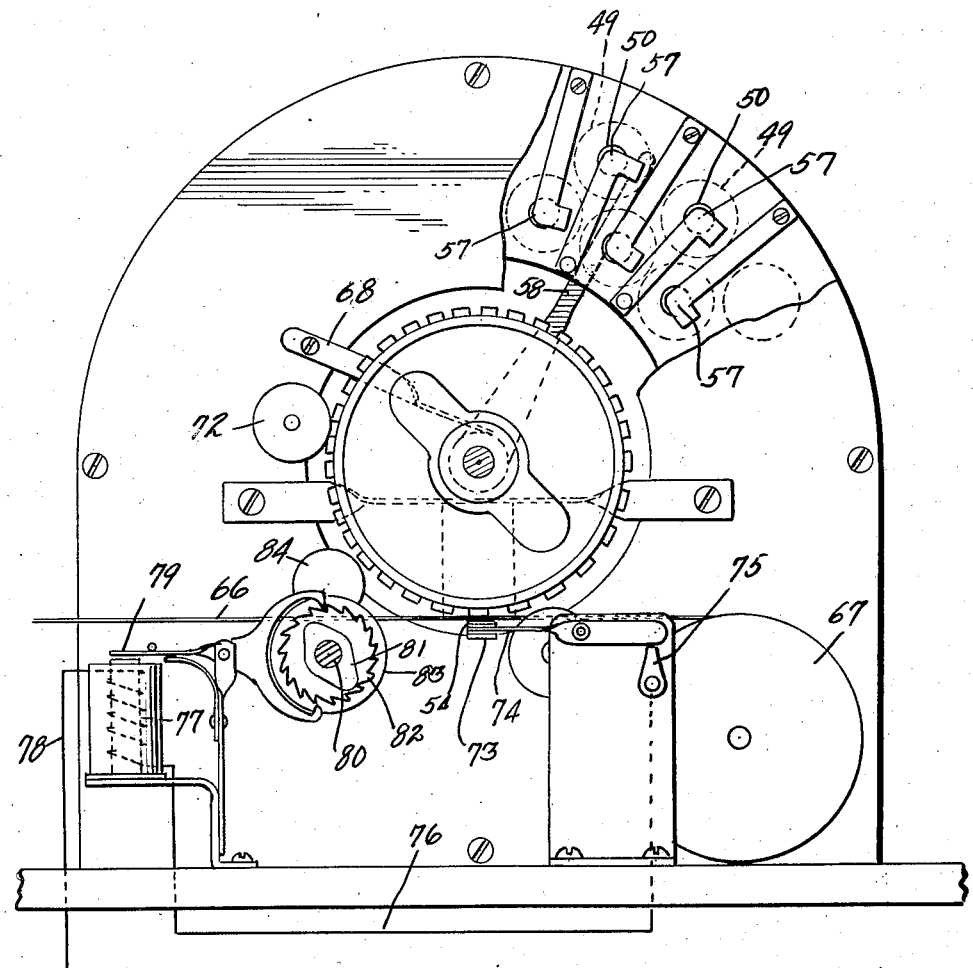
Fig. 7 is a section taken on line 7—7 of Fig. 5 and broken away to show the type pointer.

The contact strip 74 will remain in this position until the return movement of the printing armature takes place at which time, the uninsulated part of the printing armature 54 strikes the contact strip 74 and allows current to flow therethrough and through the member 75 thence through the wire 76 to the electro-magnet 77 and thence through the wire 78 to complete the circuit to the battery 37. This energizes the electro-magnet 77 and attracts the detent lever 79. The shaft 80, shown in Figs. 5 and 7, is rotated by means of pulleys and belts from the shaft 61, as shown in Fig. 5, and this produces counter-clockwise rotation of the shaft 80. A friction clutch 81 is secured to the shaft 80 and normally tends to rotate the escapement wheel 82 therewith but the escapement wheel is limited in its movement by movement of the detent lever which allows the escapement wheel to turn only one tooth at a time just after the printing letter has been struck by the printing armature 54 and the armature 54 is moving away from the type. The pressure roller 83 to which the escapement wheel 82 is secured engages the paper tape 66 between the roller 83 and the roller 84 and by this engagement of the tape, the roller advances the strip a letter at a time in order to properly space the letters on the paper strip.

In all ordinary uses the transmitting and receiving machines will be driven by synchronous motors 85 and 25 and when synchronous motors are used they will both normally have the same speed of rotation. With the transmitting drum 23 and receiving drum 41 traveling at the same rate of speed, it is only necessary that the receiving machine be made to print the character represented by the key depressed by the sender. For this purpose the sender will continuously send the letter "a", or any other character agreed upon, in order to give the receiver an opportunity to check up on the receiving instrument. As will be noted from Figs. 5 and 6, the insulating bar 86 which supports the brushes 44 is supported on arms 87, shown in Fig. 5, which are turnable on the shaft 40 of the drum 41 but insulated therefrom. One arm 87 is provided with a gear 88 secured thereto which meshes with a gear 89 and an adjusting knob 90 is provided for turning the gear 89 which meshing with the gear 88 turns the gear 88 and arms 87 to move the insulating bar 86 with the brushes to any point about the surface of the drum. In other words, these brushes may be turned through a complete circle of 360 degrees and the ring contacts 46, being continuous, provide constant contact with the outer ends of the brushes 44 no matter where they are positioned.

Thus with the sender continuously sending "a" and the type drum, for example printing "l", "o" or any other character, the operator of the receiving machine by grasping the knob 90 turns the brushes about the circumference of the drum until the letter "a" is printed by the receiving machine at which time, the sending of the message may be proceeded with as the transmitting and sending machines are in exact step.

It may be desired to have a printed copy of the message produced and retained at the sending station. This may be readily accomplished by connecting the printing mechanism, hereinbefore described, on the shaft 28 of the transmitting machine adjacent the motor 25, as will be understood from Fig. 3. To do this it would be necessary to provide a longer shaft 28, as will be understood from comparing Figs. 3 and 5.

In case synchronization of the sending and receiving drums is not possible by the use of synchronous motors as would be the case when the receiving or sending mechanism is used in an airplane, ship, train or automobile, a separate means of synchronization must be used, it being essential that the available means will rotate the receiving drum at a rate equal to or greater than the speed of the sending drum. In this case, as shown in Fig. 3, an extension 91 is provided on the end of the shaft 28 upon which is mounted a circular insulated disc 92 in the surface of which are mounted a series of contact points 93 shown in Figs. 3 and 9.

Figure 10:
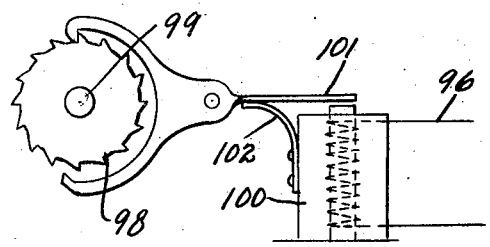
Fig. 10 is a view of the escapement for synchronizing the receiving drum with the sending drum.

These contact points 93 are provided with fixed connections 94 to the shaft 91 which, as hereinbefore described, is in circuit with one pole of the battery 14. A brush 95 is mounted in contact with the disc 92 so that as the disc 92 is rotated with the shaft 28 the brush 95 makes sequential contacts with the points 93 and this brush 95 is connected to the proper circuit of a radio transmitter or by wire direct to the receiving station and carries an electric impulse at each contact with the points 93. These synchronizing impulses are of a definite frequency due to the fact that the disc 92 is rotated at a constant speed and the frequency of the synchronizing impulse is enough different from the frequency of the operating impulse that they can readily be filtered out with ordinary receiving apparatus for this purpose. Referring to Fig. 10, I show a wire 96 either as a direct wire from the brush 95 or filtered from a wire carrying both the operating and sending impulses or in case of a radio impulse, filtered from the operating impulse by a proper hook-up with a radio receiving set. In this case, it must be remembered that the synchronizing impulse is entirely independent of the operating impulse and as previously mentioned the means for driving the receiving drum must be able to rotate the receiving drum at a speed equal to or greater than the speed of the transmitting drum.

For this reason it is necessary to interpose between the driving mechanism of the receiving machine and the drum which it rotates, some means for controlling the speed of the drum independent of the speed of the motor. For this reason a friction clutch 97 may be provided on the shaft 61, as shown in dotted lines in Fig. 5, and the shaft may be split between the two clutch elements and this is shown in dotted lines as it is required only when synchronous motors or other synchronizing power means are not available. An escapement wheel 98 may be mounted on the shaft 61, as shown in dotted lines in Fig. 5, or may be mounted on the shaft 40 of the receiving drum or the escapement may be mounted on an auxiliary shaft 99, as shown in Fig. 10, and the impulse operating the electromagnet 100 will attract the detent lever 101 thus allowing the escapement to move one tooth each time the lever is attracted and released while the spring 102 returns the detent lever after the impulse. The friction clutch 97 tends to continuously rotate the escapement wheel 98 in a counterclockwise direction but the friction clutch 97 allows the escapement wheel to turn the shaft 99 at the same speed of the shaft 28 on the transmitting drum. The shaft 99 may be geared to the receiving drum or may be utilized to drive the receiving drum direct.

By this arrangement the two drums may be synchronized in the transmitting and receiving machines so that they both travel at the same speed and the knob 90 may be turned to move the brushes 44 so that the key pressed on the transmitting machine prints the same letter on the receiving machine. The circuit between the transmitting and receiving machines is shown diagrammatically in Fig. 8 and when wire communication is utilized, the two circuits are connected by the wires 103 and 104 but when wireless is used these wires are left off and a wireless transmitter 105 is provided in the transmitting circuit and a wireless receiver 106 is provided in the receiving circuit.

I have also shown in Figs. 11 and 12 a means of sending the impulse as above by utilizing a perforated paper in lieu of the keyboard and relay assembly. The means for perforating the paper is not here shown as this is common practice and a machine designed to perforate for this particular mechanism would probably have no patentable features but could easily be designed by a competent engineer. In the form shown in Figs. 11 and 12, the same drum 23 is utilized having a series of evenly spaced contact brushes 21 corresponding in number to the characters of the perforated machine keyboard.

The paper is placed, as shown in Fig. 12, between the contact brushes 21 and the drum 23 and by means of rollers 107 and 108 properly connected to the drive shaft by gears 109 and 110, the paper is drawn forward at speed approximately equal to one letter space for each revolution of the drum 23. If more than one spiral contact is used on the drum, the forward speed of the paper would necessarily be faster to correspond. As the paper is drawn forward, the brushes 21 are permitted to touch the drum 23 through the perforations 11 and in proper sequence make contact with the spiral contact 26 completing the impulse circuit to the radio or wired circuits such as telegraph or telephone line.

From the foregoing description, it becomes evident that the device is very efficient in operation, will not easily get out of order, may be adjusted so that the printing of the receiving machine corresponds with the keys of the transmitting machine and provides a device which accomplishes the objects described.

Having thus fully described my invention, its utility and mode of operation, what I claim and desire to secure by Letters Patent of the United States is—

1. In a device of the character described, a transmitting drum, a remote receiving drum, a series of character keys, a circuit for each character key adapted to be closed by depression of the respective character key, a brush for each circuit riding in contact with the surface of the transmitting drum, means for rotating the transmitting drum, a spiral contact strip on the transmitting drum adapted to be moved beneath the brushes during rotation of the transmitting drum, a receiving machine, a receiving drum for the receiving machine, means for transmitting electrical impulses from the transmitting machine to the receiving machine, means for rotating the receiving drum at the same speed as the transmitting drum, a series of brushes riding in contact with the surface of the receiving drum, a contact strip on the receiving drum adapted to be moved beneath the brushes during rotation of the receiving drum, a printing drum having a series of type characters thereon corresponding to the character keys, a paper strip movable beneath the printing drum, a series of circuits for the brushes of the receiving drum adapted to control movement of the printing drum, electrically operated means for moving the paper strip into contact with the type faces of the printing drum and means for advancing the paper strip as it is moved away from the printing drum.

2. In a device of the character described, a transmitting drum, a remote receiving drum, electrically operated means for synchronously rotating both drums, each drum being provided with a spiral contact strip, a series of brushes riding in contact with the surface of the transmitting drum and adapted to make sequential contacts with the spiral strip thereon, a key operated circuit for each brush, a series of brushes riding in contact with the surface of the receiving drum and adapted to make sequential contacts with the spiral contact strip thereon, a tubular member about the receiving drum, a series of contact rings embedded in the tubular member and adapted to be contacted by the brushes of the receiving drum and a bar supporting the brushes between the receiving drum and the tubular member and turnable to any position about the circumference of the receiving drum, a circuit for each brush of the receiving drum and printing means controlled by the closing of the said circuits.

3. In a device of the character described, a transmitting drum, a remote receiving drum, means for rotating the transmitting drum, means for rotating the receiving drum at the same speed as the transmitting drum, a spiral contact strip embedded in the surface of each drum, a series of brushes riding in contact with the surface of the transmitting drum and adapted to make sequential contacts with the spiral strip thereon, a key controlled circuit for each brush of the transmitting drum, a series of brushes riding in contact with the surface of the receiving drum and adapted to make sequential contacts with the contact strip thereon, manually operated means for moving the brushes about the circumference of the receiving drum, a printing mechanism, a circuit for each brush of the receiving drum, the circuits being arranged to control the printing mechanism and electrically operated means for pressing a paper strip into contact with the printing means.

4. In a device of the character described, a transmitting drum, a remote receiving drum, electrically operated means for synchronously rotating both drums, each drum being provided with a spiral contact strip, a series of brushes riding in contact with the surface of the transmitting drum and adapted to make sequential contacts with the spiral strip thereon, a key operated circuit for each brush, a series of brushes riding in contact with the surface of the receiving drum and adapted to make sequential contacts with the spiral contact strip thereon, a circuit for each brush of the receiving drum, printing means controlled by the closing of the said circuits for the receiving drum brushes, and manual means for varying the position of the brushes so that the printing mechanism will print according to the key depressed in the transmitting mechanism.

5. In a device of the character described, a transmitting drum a remote receiving drum, means for synchronously rotating both drums, each drum being provided with a spiral contact strip, a series of brushes riding in contact with the surface of the transmitting drum and adapted to make sequential contacts with the spiral strip thereon, a circuit for each brush, a key for each circuit, the operation of each key closing the circuit to the respective brush, a series of brushes riding in contact with the surface of the receiving drum and adapted to make sequential contacts with the spiral contact strip thereon, a circuit for each brush of the receiving drum, printing means controlled by the closing of the said circuits and means for moving the brushes about the surface of the receiving drum to cause the printed letter to correspond with the key depressed in the transmitting machine.

6. In a device of the character described, a transmitting drum, a remote receiving drum, means for synchronously rotating both drums, each drum being provided with a spiral contact strip, a series of brushes riding in contact with the surface of the transmitting drum and adapted to make sequential contacts with the spiral strip thereon, a circuit for each brush, a series of brushes riding in contact with the surface of the receiving drum and adapted to make sequential contacts with the spiral contact strip thereon, a series of keys each adapted upon operation to close the circuit to the respective brush of the transmitting drum, means for transmitting current impulses from the brushes of the transmitting drum to the brushes of the receiving drum and a printing mechanism adapted to be operated upon contact of the receiving brushes with the contact strip of the receiving drum and manual means for moving the brushes of the receiving drum about the circumference thereof.

7. In a device of the character described, a transmitting drum, a receiving drum, means for synchronously rotating both drums, each drum being provided with a spiral contact strip, a series of brushes riding in contact with the surface of the transmitting drum and adapted to make sequential contacts with the spiral strip thereon, a series of brushes riding in contact with the surface of the receiving drum and adapted to make sequential contacts with the spiral contact strip thereon, a bar supporting the brushes for the receiving drum, manually operable means for turning the bar and brushes about the circumference of the receiving drum and a printing mechanism adapted to be operated through circuits closed by contact of the brushes of the receiving drum with the spiral strip of the receiving drum.

8. In a device of the character described, a transmitting drum having a spiral contact strip embedded in the surface thereof, a series of brushes riding on the surface of the transmitting drum and adapted to make sequential contacts with the spiral contact strip thereon, a receiving drum having a spiral contact strip embedded in the surface thereof, a brush bar, a series of brushes mounted in the brush bar and adapted to make sequential contacts with the spiral strip of the receiving drum, means for synchronously rotating both drums and manually operable means for turning the brush bar about the circumference of the receiving drum.

9. In a device of the character described, a transmitting machine having a series of keys, a transmitting drum provided with a spiral contact, means for rotating the drum, a series of contact brushes riding in contact with the surface of the drum and adapted to make sequential contact with the spiral contact thereon, a receiving drum, means for rotating the receiving drum at the same speed as the transmitting drum, the receiving drum being provided with a spiral contact strip, a series of brushes riding in contact with the surface of the receiving drum and adapted to make sequential contacts with the spiral strip thereon and manually operable means for turning the brushes to any point about the circumference of the receiving drum.

10. In a device of the character described, a pair of synchronously and constantly rotating drums adapted to transmit and receive electrical impulses, a series of keys adapted to be depressed to produce the electrical impulses, and means whereby only one impulse is sent upon depression of any transmitting key.

11. In a device of the character described, a pair of synchronously and constantly rotating drums adapted to transmit and receive electrical impulses, a series of devices for each drum by each of which an electrical impulse may be transmitted, manual means for determining which of a series of said devices shall be caused to transmit an impulse by rotation of the drum, and means whereby only one impulse may be transmitted upon each actuation of the manual means.

12. In a device of the character described, a pair of synchronously and constantly rotating drums, means associated therewith, each actuatable by rotation of the drum to transmit a predetermined electrical impulse, manual means for determining which one of the said series of impulse transmitting devices is to be actuated by the drum, and means whereby only one impulse may be transmitted by the device by reason of a single operation of the manual determining means.

13. In a device of the character described, a pair of synchronously and constantly and rapidly rotating drums, a series of impulse transmitting devices, means for predetermining which one of the said series shall be caused to transmit an impulse by rotation of the drum, and means whereby only one impulse may be transmitted by the predetermined device regardless of the number of rotations of the drum during the interval the device is set to transmit an impulse.

14. In a device of the character described, a pair of synchronously rotating drums one adapted to transmit and the other to receive electrical impulses, a primary electric circuit, a series of armatures and keys in the primary circuit so arranged that the depression of any key causes contact of its companion armature to close the primary circuit, a normally open secondary circuit associated with the transmitting drum and closable through rotation thereof, an armature normally forming part of the primary circuit, an electro-magnet having a coil in the secondary circuit arranged to attract and hold the last named armature to break the primary circuit and establish a third circuit, said third circuit including the last named armature companion to the key and the coil of the electro-magnet and causing the portion of the secondary circuit in which the transmitting drum is positioned to be deenergized whereby the transmitting drum cannot produce a second impulse until said third circuit is deenergized.

15. In a device of the character described, a rotatable drum adapted to transmit electrical impulses and an independently rotated drum adapted to receive electrical impulses, means associated with each drum independently of that of the other whereby synchronous rotation of the drums may be secured, a series of devices associated with each drum by each of which an electrical impulse may be transmitted and received, and manual means for determining which one of said series of said devices shall be caused to transmit an impulse by rotation of a drum.

16. In a device of the character described, a transmitting and a receiving drum respectively adapted to transmit and receive electrical impulses, means for rotating the transmitting drum at practically constant speed, means for rotating the receiving drum at a speed approximating the speed of rotation of the transmitting drum, a secondary impulse transmitting device connected with the transmitting drum, an electric filter device connected with the receiving drum, a scape wheel, a detent and an electro-magnet assembly in connection with the receiving drum arranged after the manner described to modify the speed of rotation of the receiving drum to bring it to synchronism with that of the transmitting drum.

17. In a device of the character described, a pair of synchronously rotating drums, one adapted to transmit and the other to receive electrical impulses, a spiral contact element on the transmitting drum, a series of contact brushes associating with the transmitting drum, a perforated element movable in association with the transmitting drum in a manner to permit selected sequential contacts of the brushes through the perforations with the spiral contact element of the transmitting drum, a circuit therefor whereby said contact brushes and spiral contact create electrical impulses, and means for sending impulses from the transmitting drum to a receiving drum.

18. In a device of the character described, a pair of synchronously rotating drums, one adapted to transmit and the other to receive electrical impulses, a spiral contact element on the transmitting drum, a series of contact brushes associating with the transmitting drum, a perforated element movable in association with the transmitting drum substantially tangent to the surface thereof and positioned between the said series of contact brushes in a manner to permit selected sequential contacts of the brushes through the perforations with the spiral contact element of the transmitting drum, a circuit therefor whereby said contact brushes and spiral contact create electrical impulses, and means for sending impulses from the transmitting drum to a receiving drum.

19. In a device of the character described, mechanism arranged and adapted to transmit electrical impulses, a receiving mechanism for receiving said impulses, said transmitting mechanism having parts rotating in synchronism, the said transmitting and receiving mechanisms being operable in synchronism, said transmitting mechanism comprising a primary electric circuit, manually operable means for closing the circuit, a primary electro-magnet acting upon the closing of the circuit to maintain said circuit closed, a secondary circuit, an electro-magnet having a coil thereof in the secondary circuit, said circuit being closable through rotation of the rotating element of the transmitting mechanism, an armature in conjunction with the secondary electro-magnet acted upon by the closing of the secondary circuit to break the primary circuit thereby deenergizing the primary electro-magnet and releasing the armature thereof.

20. In a device of the character described, a mechanism adapted to transmit electrical impulses, a mechanism adapted to receive said impulses, the transmitting and receiving mechanism rotating in synchronism, a primary electric circuit, a manually operable means for closing said circuit, a primary electro-magnet having an armature and upon energization maintaining the primary circuit closed, a secondary circuit, a secondary electro-magnet having a coil in said secondary circuit, said secondary circuit being closable at will at any point of movement of the rotative part of the transmitting mechanism, an armature acted upon by the secondary electro-magnet at the time the secondary circuit is closed to break the primary circuit, a third electric circuit completed by the armature of the secondary electro-magnet whereby the coil of the secondary electro-magnet is energized during the time the primary armature is held by the primary electro-magnet thereby preventing transmission of a second impulse by the transmitting mechanism upon a single manual closing of the primary circuit.

21. In a device of the character described, two synchronously rotating elements one adapted to transmit and the other to receive electric impulses, four separate electric circuits in conjunction with which the transmitting element operates, the primary circuit including an electro-magnet, an armature adapted to be manually closed, a second circuit including an electro-magnet and the armature of the primary electro-magnet, a brush for contacting the transmitting rotating element, a source of current supply, one or more contacts of the rotating element being constantly in connection with one pole of the said supply source, said secondary circuit being completed by contact of the brush with a contact part of the rotating element, a third circuit including the primary armature, the coil of the secondary electro-magnet, the armature forming part of the primary circuit and becoming a part of the third circuit upon energization of the secondary electro-magnet on closing of the secondary circuit, and a fourth or impulse circuit created by the closing of the secondary armature through energization of the secondary electro-magnet with which is associated a means for transmitting the impulse to the receiving mechanism.

22. In a device of the character described, a pair of synchronously rotating elements, one adapted to transmit and the other to receive electric impulses, a primary electric circuit, an electro-magnet having a coil in the said circuit, an electric impulse receiving means for conducting an incoming impulse to said coil, a series of secondary electro-magnets each having a coil and a circuit of which the coil forms a part, an electric circuit completed by energization of the primary electro-magnet and actuation of its armature to cause an impulse to be conducted through the receiving rotating element to the coil of a selected secondary electro-magnet, a secondary armature acted upon by the selected secondary electro-magnet, and a third circuit common to the coils of the secondary electro-magnet maintained closed through energization of the selected secondary electro-magnet.

23. In a device of the character described, a type wheel adapted to be rotatively positioned to effect the printing of a character, an electro-magnet, a spring biased armature therefor to cause return movement, a circuit for the said electro-magnet through energization of which the armature is caused to effect a printing, a second electric circuit, means actuated through return movement of the armature to close the second circuit, means including a second electro-magnet energized through closing of the second circuit to effect forward movement of the paper between printing operations.

CLIFFORD H. KAIN.